(12) United States Patent
Dinh et al.

(10) Patent No.: US 11,767,447 B2
(45) Date of Patent: Sep. 26, 2023

(54) TOPCOAT COMPOSITION OF IMAGING BLANKET WITH IMPROVED PROPERTIES

(71) Applicant: XEROX CORPORATION, Norwalk, CT (US)

(72) Inventors: Kenny-Tuan T. Dinh, Webster, NY (US); Alexander N. Klymachyov, Webster, NY (US); Lin Ma, Pittsford, NY (US); Kyle B. Tallman, Perry, NY (US); Eric Robert Dudek, Webster, NY (US); Michael L. Mehan, Pittsford, NY (US); Harry F. Freitas, Jr., Webster, NY (US); Angela Schnuerch, Naples, NY (US); Michael S. Roetker, Webster, NY (US); Ngoc-Tram Le, Webster, NY (US); Varun Sambhy, Pittsford, NY (US); Santokh S. Badesha, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 153 days.

(21) Appl. No.: 17/152,551

(22) Filed: Jan. 19, 2021

(65) Prior Publication Data
US 2022/0228030 A1 Jul. 21, 2022

(51) Int. Cl.
*C09D 183/08* (2006.01)
*C09D 7/61* (2018.01)
(Continued)

(52) U.S. Cl.
CPC .......... *C09D 183/08* (2013.01); *B41C 1/1016* (2013.01); *B41M 1/06* (2013.01);
(Continued)

(58) Field of Classification Search
None
See application file for complete search history.

(56) References Cited

U.S. PATENT DOCUMENTS

| 4,339,553 A | 7/1982 | Yoshimura et al. |
| 4,970,098 A | 11/1990 | Ayala-Esquilin et al. |

(Continued)

FOREIGN PATENT DOCUMENTS

| DE | 102018212949 A1 | 2/2020 |
| EP | 1900527 A1 | 3/2008 |

(Continued)

OTHER PUBLICATIONS

Author Unknown, "Chemical reactions on the 'finished' silicone," Silicones Europe, http://www.silicones.eu/science-research/chemistry/chemical-reactions-on-the-finished-silicone, accessed Dec. 13, 2014, pp. 1-4.

(Continued)

*Primary Examiner* — Kenneth J Stachel
(74) *Attorney, Agent, or Firm* — MH2 Technology Law Group LLP

(57) ABSTRACT

Provided herein is a topcoat composition comprising at least one fluorosilicone, a hydride-functional crosslinking agent, an infrared-absorbing filler, and at least one dispersant that is non-reactive with the hydride-functional crosslinking agent, by weight based on a total weight of the topcoat composition, wherein the topcoat composition has a degree of crosslinking between about 10 micrograms/hour/milligrams to about 20 micrograms/hour/milligrams. Further (Continued)

provided herein are methods of making the topcoat composition, as well as an imaging blanket and methods of reducing coating defects on a media coated using the imaging member.

16 Claims, 2 Drawing Sheets

(51) Int. Cl.
    *C09D 7/65*     (2018.01)
    *B41C 1/10*     (2006.01)
    *C09D 5/32*     (2006.01)
    *C09D 7/63*     (2018.01)
    *C09D 7/41*     (2018.01)
    *B41M 1/06*     (2006.01)

(52) U.S. Cl.
    CPC ............... *C09D 5/32* (2013.01); *C09D 7/41* (2018.01); *C09D 7/61* (2018.01); *C09D 7/63* (2018.01); *C09D 7/65* (2018.01)

(56) References Cited

U.S. PATENT DOCUMENTS

| | | |
|---|---|---|
| 4,997,642 A | 3/1991 | Curtis et al. |
| 5,145,518 A | 9/1992 | Winnik et al. |
| 5,146,087 A | 9/1992 | VanDusen |
| 5,202,265 A | 4/1993 | LaMora |
| 5,208,630 A | 5/1993 | Goodbrand et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik et al. |
| 5,286,286 A | 2/1994 | Winnik et al. |
| 5,301,044 A | 4/1994 | Wright |
| 5,356,485 A | 10/1994 | Kreider |
| 5,378,574 A | 1/1995 | Winnik et al. |
| 5,385,803 A | 1/1995 | Duff et al. |
| 5,464,703 A | 11/1995 | Ferrar et al. |
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,808,645 A | 9/1998 | Reeves et al. |
| 5,841,456 A | 11/1998 | Takei et al. |
| 5,945,245 A | 8/1999 | Mychajlowskij et al. |
| 6,015,858 A * | 1/2000 | Gornowicz ............ C08L 83/04 524/413 |
| 6,020,300 A | 2/2000 | Tcheou et al. |
| 6,042,227 A | 3/2000 | Meinhardt et al. |
| 6,051,562 A | 4/2000 | Chamberlain et al. |
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,547,137 B2 | 6/2009 | Nakamura |
| 7,582,359 B2 | 9/2009 | Sabol et al. |
| 7,608,325 B2 | 10/2009 | Rasch et al. |
| 7,767,011 B2 | 8/2010 | Bedford et al. |
| 7,780,286 B2 | 8/2010 | Yahiro |
| 7,828,480 B2 | 11/2010 | Adelsberg et al. |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,056,958 B2 | 6/2015 | Kanungo et al. |
| 9,126,430 B2 | 9/2015 | Liu |
| 9,138,985 B1 | 9/2015 | Yang et al. |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,206,269 B2 | 12/2015 | Kanungo et al. |
| 9,211,697 B2 | 12/2015 | Dooley et al. |
| 9,227,393 B2 | 1/2016 | Song et al. |
| 9,233,533 B2 | 1/2016 | Kanungo et al. |
| 9,259,915 B2 | 2/2016 | Dooley et al. |
| 9,273,218 B2 | 3/2016 | Liu |
| 9,284,469 B2 | 3/2016 | Song et al. |
| 9,303,135 B2 | 4/2016 | Eliyahu et al. |
| 9,303,185 B2 | 4/2016 | Sambhy et al. |
| 9,327,519 B1 | 5/2016 | Larson et al. |
| 9,353,290 B2 | 5/2016 | Condello et al. |
| 9,365,742 B2 | 6/2016 | Gervasi et al. |
| 9,421,758 B2 | 8/2016 | Song et al. |
| 9,458,341 B2 | 10/2016 | Song et al. |
| 9,611,404 B2 | 4/2017 | Sisler et al. |
| 10,948,357 B2 | 3/2021 | Cox |
| 11,199,456 B2 | 12/2021 | DeKam et al. |
| 2002/0064648 A1 | 5/2002 | Schlueter, Jr. et al. |
| 2003/0067528 A1 | 4/2003 | Chowdry et al. |
| 2003/0152132 A1 | 8/2003 | Pipe et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Hiemstra et al. |
| 2004/0253436 A1 | 12/2004 | Heeks et al. |
| 2005/0018027 A1 | 1/2005 | Pan et al. |
| 2005/0287386 A1 | 12/2005 | Sabol et al. |
| 2006/0008599 A1 | 1/2006 | Hiyama |
| 2006/0105117 A1 | 5/2006 | Kim et al. |
| 2006/0105177 A1 | 5/2006 | Gervasi et al. |
| 2006/0147659 A1 | 7/2006 | Foley |
| 2006/0152566 A1 | 7/2006 | Taniuchi et al. |
| 2006/0263532 A1* | 11/2006 | Kaplan ............. G03G 15/2057 428/447 |
| 2007/0179291 A1 | 8/2007 | Thibodeau et al. |
| 2007/0207186 A1 | 9/2007 | Scanlon et al. |
| 2007/0207269 A1 | 9/2007 | Woodhall et al. |
| 2007/0242722 A1 | 10/2007 | Nakamura |
| 2007/0266896 A1 | 11/2007 | Suwa et al. |
| 2008/0032072 A1 | 2/2008 | Taniuchi et al. |
| 2008/0055381 A1 | 3/2008 | Doi et al. |
| 2008/0175304 A1 | 7/2008 | Adelsberg et al. |
| 2008/0206571 A1 | 8/2008 | Berckmans et al. |
| 2009/0110942 A1 | 4/2009 | Henderson-Rutgers et al. |
| 2009/0152664 A1 | 6/2009 | Klem et al. |
| 2009/0195579 A1 | 8/2009 | Tousi et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0028620 A1 | 2/2011 | Faucher et al. |
| 2011/0118378 A1* | 5/2011 | Bublewitz ............ C08L 83/04 523/109 |
| 2011/0122195 A1 | 5/2011 | Kovacs et al. |
| 2011/0122210 A1 | 5/2011 | Sambhy et al. |
| 2011/0190410 A1* | 8/2011 | Nozoe ................ C08G 77/20 521/154 |

(56) References Cited

U.S. PATENT DOCUMENTS

| | | |
|---|---|---|
| 2011/0269849 A1 | 11/2011 | Yao |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0121827 A1 | 5/2012 | Baird et al. |
| 2012/0135650 A1 | 5/2012 | Servante et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0244173 A1 | 9/2013 | Qiu et al. |
| 2013/0266803 A1 | 10/2013 | Dooley et al. |
| 2013/0272763 A1 | 10/2013 | Moorlag et al. |
| 2014/0060352 A1 | 3/2014 | Gervasi |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Sole Rojals et al. |
| 2015/0004861 A1 | 1/2015 | Gervasi et al. |
| 2015/0022602 A1 | 1/2015 | Landa et al. |
| 2015/0031806 A1 | 1/2015 | Lim et al. |
| 2015/0077501 A1 | 3/2015 | Breton et al. |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1 | 6/2015 | Sambhy et al. |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |
| 2015/0343797 A1 | 12/2015 | Song et al. |
| 2016/0083606 A1 | 3/2016 | Sisler et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |
| 2016/0176185 A1 | 6/2016 | Kanungo et al. |
| 2016/0237296 A1 | 8/2016 | Song et al. |
| 2016/0280949 A1 | 9/2016 | Song et al. |
| 2016/0305271 A1 | 10/2016 | Schmidt et al. |
| 2016/0326376 A1 | 11/2016 | Song et al. |
| 2017/0015115 A1 | 1/2017 | Chen et al. |
| 2017/0051155 A1 | 2/2017 | Larson et al. |
| 2017/0081545 A1 | 3/2017 | Sisler et al. |
| 2017/0130087 A1 | 5/2017 | Sisler et al. |
| 2017/0145240 A1 | 5/2017 | Sisler et al. |
| 2017/0341452 A1 | 11/2017 | Kanungo et al. |
| 2018/0029351 A1* | 2/2018 | Badesha ............... C09D 7/61 |
| 2018/0050532 A1* | 2/2018 | Stowe .................... B41N 10/00 |
| 2018/0058953 A1 | 3/2018 | Byvank et al. |
| 2019/0113398 A1 | 4/2019 | Comas et al. |
| 2019/0308372 A1 | 10/2019 | Fernandez Aymerich et al. |
| 2020/0346405 A1 | 11/2020 | Norfolk et al. |
| 2020/0378838 A1 | 12/2020 | Litteaur |
| 2021/0394448 A1 | 12/2021 | Atwood et al. |
| 2021/0396591 A1 | 12/2021 | Atwood et al. |
| 2021/0396593 A1 | 12/2021 | Atwood et al. |
| 2022/0063317 A1 | 3/2022 | Sambhy et al. |
| 2022/0134669 A1 | 5/2022 | Garcia Grau et al. |
| 2022/0195221 A1 | 6/2022 | Allen et al. |
| 2022/0205845 A1 | 6/2022 | Atwood et al. |

FOREIGN PATENT DOCUMENTS

| | | |
|---|---|---|
| EP | 2228690 A1 | 9/2010 |
| EP | 3336150 A1 | 6/2018 |
| JP | 62112647 A | 5/1987 |
| WO | 2005047385 A1 | 5/2005 |
| WO | 2015105668 A1 | 7/2015 |
| WO | 2018194482 A1 | 10/2018 |
| WO | 2020212488 A8 | 10/2020 |

OTHER PUBLICATIONS

Author Unknown, "Dot Tool," Quality Engineering Associates, Inc., May 9, 2016, pp. 1-3.

Author Unknown, "Products and Properties: Desmodur/Desmophen for Coatings, Commercial Products," Bayer MaterialScience AG brochure, Edition: 2005-07 E, 28 pages.

Author Unknown, "Byk-Silclean 3700" by BYK Chemie, http://www.specialchem4coatings.com/tds/byk-silclean-3700/byk-chemie/10414/index.aspx?q= Byk%20Silclean%203700, 2013, 1 page.

Author Unknown, "Desmodur N 3790 BA," Bayer MaterialScience, LLC., http://www.bayermaterialsciencenafta.com/products/index.cfm?mode=lit&pp_num=EB7C52DD-F4EC-BDA1-6BE0225FEE5C1FD0&pg_num=EB7C5520-9065-98A0-5A4CD71113D57191&pf=0&pf=1, 2007, 1 page.

Bercen Inc., "Berset 2185," Technical Data Sheet, Mar. 14, 2012, 2 pages.

"Dimer Acids," Kirk-Othmer Encyclopedia of Chemical Technology, 1993, vol. 8, 4th Ed., pp. 223-237.

Cabot, "Specialty Carbon Blacks for Ultraviolet Protection & Weatherability," Cabot Corporation, Jun. 28, 2015, 2 pages.

Derwent Abstract of JP 62112647 A, 1990.

DOW, DOW Surfactants, http://www.dow.com/surfactants/products/second.htm, retrieved Mar. 10, 2014, pp. 1-2.

DOW, Material Safety Data Sheet, "TERGITOL(TM) TMN-6 (90% AQ)," The Dow Chemical Company, Feb. 12, 2003, pp. 1-15.

DOW, Product Safety Assessment, "TRITON CF Series Surfactants," Dec. 16, 2012, 6 pages.

DuPont, "DuPont Elvanol 51-05 Polyvinyl Alcohol," Product Data Sheet, 2006, http://www2.dupont.com/Elvanol/en_US/assets/downloads/elvanol_51_05.pdf, 3 pages.

Extended European Search Report for European Patent Application No. 21177430.2, dated Oct. 25, 2021, 9 pages.

Extended European Search Report for European Application No. 21214119.6, dated May 16, 2022, 6 pages.

Jikei et al., "Synthesis and Properties of Hyperbranched Aromatic Polyamide Copolymers from AB and AB2 Monomers by Direct Polycondensation," Macromolecules, 2000, 33:6228-6234.

Kahn, Bruce E.,"The M3D Aerosol Jet System, An Alternative to Inkjet Printing for Printed Electronics," Organic and Printed Electronics, Winter 2007 1(1):14-17.

Kousiatza et al., "Temperature Mapping of 3D Printed Polymer Plates: Experimental and Numerical Study," MDPI, Sensors, 2017, 17(456), 14 pages.

Law et al., "Self Cleaning Polymers and Surfaces," TechConnect World Conference & Expo, Jun. 13-16, 2011, abstract of presentation, 1 page.

Notice of Submission of Opinions, issued in Korean Application No. 10-2021-0075857 (including a Google machine-translation), Apr. 28, 2022 18 pages.

Philipp et al., "Three Methods for In Situ Cross-Linking of Polyvinyl Alcohol Films for Application as Ion-Conducting Membranes in Potassium Hydroxide Electrolyte," NASA, Apr. 1979, 18 pages.

Reddy et al., "Citric acid cross-linking of starch films," University of Nebraska—Lincoln, Faculty Publications—Textiles, Merchandising and Fashion Design, Paper 25, 2009, pp. 702-711.

Song, "Starch crosslinking for cellulose fiber modification and starch nanoparticle fomnation," https://smarttech.gatech.edu/handle/1853/39524?show=full, downloaded Jan. 22, 2015, 4 pages.

Tse, Ming-Kai, "PIAS-II TM—A High-performance Portable Tool for Print Quality Analysis Anytime, Anywhere," Quality Engineering Associates (QEA), Inc., Jun. 2007, pp. 1-4.

(56) References Cited

OTHER PUBLICATIONS

Wang et al., "Preparation of a Crosslinking Cassava Starch Adhesive and its Application in Coating Paper," BioResources, 2013, 8(3):3574-3589.
Wikimedia, "Tetracarboxylic acids," 2 pages, printed on Aug. 19, 2015, https://commons.wikimedia.org/wiki/Category:Tetracarboxylic_acids.
Wikipedia, "Dicarboxylic Acid," 7 pages, printed on Aug. 19, 2015.
Wikipedia, "Hydrocarbon," Downloaded Mar. 2, 2016, 8 pages.
Wikipedia, "Tricarboxylic Acid," 2 pages printed on Aug. 19, 2015.

* cited by examiner

TOPCOAT COMPOSITION OF IMAGING BLANKET WITH IMPROVED PROPERTIES

DETAILED DESCRIPTION

Field of the Disclosure

This disclosure relates generally to marking and printing systems, and more specifically to a topcoat composition for an imaging blanket of such a system.

Background

Typical lithographic and offset printing techniques use plates that are permanently patterned and are therefore useful only when printing a large number of copies of the same image (i.e., long print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed that uses an imaging member comprising a non-patterned reimageable surface or imaging blanket that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned imaging blanket. Ink applied thereover is retained in the pockets formed by the removal of the dampening fluid. The inked surface is then brought into contact with a print substrate, and the ink transfers from the pockets in the dampening fluid layer to the print substrate. The dampening fluid may then be removed, a new uniform layer of dampening fluid applied to the imaging blanket, and the process repeated.

The imaging blanket comprises a low surface energy top coat, for example a dispersion comprising fluorosilicone and infrared-absorbing fillers such as carbon black. This dispersion is typically applied as a wet film onto an engineered rubber substrate known as a "carcass" and then cured at a high temperature, such as at about 160° C. for about 4 hours, to yield the final imaging blanket with a topcoat. Current topcoat compositions comprising carbon black and fluorosilicone, however, may include additives such as dispersing agents or dispersants to improve the incorporation and uniform dispersion of carbon black and other functional fillers. These dispersants further improve the storage stability, rheological properties, and coating process characteristics of the topcoat composition. Some dispersants may participate in or catalyze interactive unintended reactions with other constituents in the formulations. For example, known dispersants may have chemical functional groups that interact with portions of the crosslinked polymer topcoat composition, leading to variability in topcoat storage stability and processing, insufficient physical properties of the imaging blanket topcoat, and unfavorable print quality performance.

There is thus a need in the art for imaging blankets having improved topcoats, such that the physical properties and crosslinking performance of the topcoat are optimized while maintaining consistent print quality performance.

SUMMARY

Disclosed herein is a topcoat composition for an imaging blanket for variable data lithography that comprises a fluorosilicone, a hydride-functional crosslinking agent, an infrared-absorbing filler, such as carbon black, and at least one dispersant that is non-reactive with the hydride-functional crosslinking agent. In certain embodiments, the topcoat composition has a degree of crosslinking between about 10 micrograms/hour/milligrams to about 20 micrograms/hour/milligrams.

Further disclosed herein is an imaging blanket for variable data lithography comprising (i) a substrate and (ii) a topcoat composition disposed on the substrate that comprises at least one fluorosilicone, at least one infrared-absorbing filler such as carbon black, and at least one dispersant that is non-reactive with the hydride-functional crosslinking agent, present in an amount ranging from about 0.1% to about 5%, based on a total weight of the topcoat composition, wherein the topcoat composition has a degree of crosslinking between about 10 micrograms/hour/milligrams to about 20 micrograms/hour/milligrams.

In certain embodiments, the substrate comprises at least one material selected from the group consisting of metals, polyimides, plastic composites, and woven fabrics. In certain embodiments, the topcoat composition is cured to the substrate at a temperature ranging from about 135° C. to about 165° C. for a time period ranging from about 15 minutes to about 5 hours. According to various aspects disclosed herein, the topcoat composition has a thickness ranging from about 0.5 µm to about 4 mm.

According to various embodiments of the disclosure, the at least one dispersant that is non-reactive with the hydride-functional crosslinking agent is present in an amount ranging from about 0.1% to about 5%, based on a total weight of the topcoat composition.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
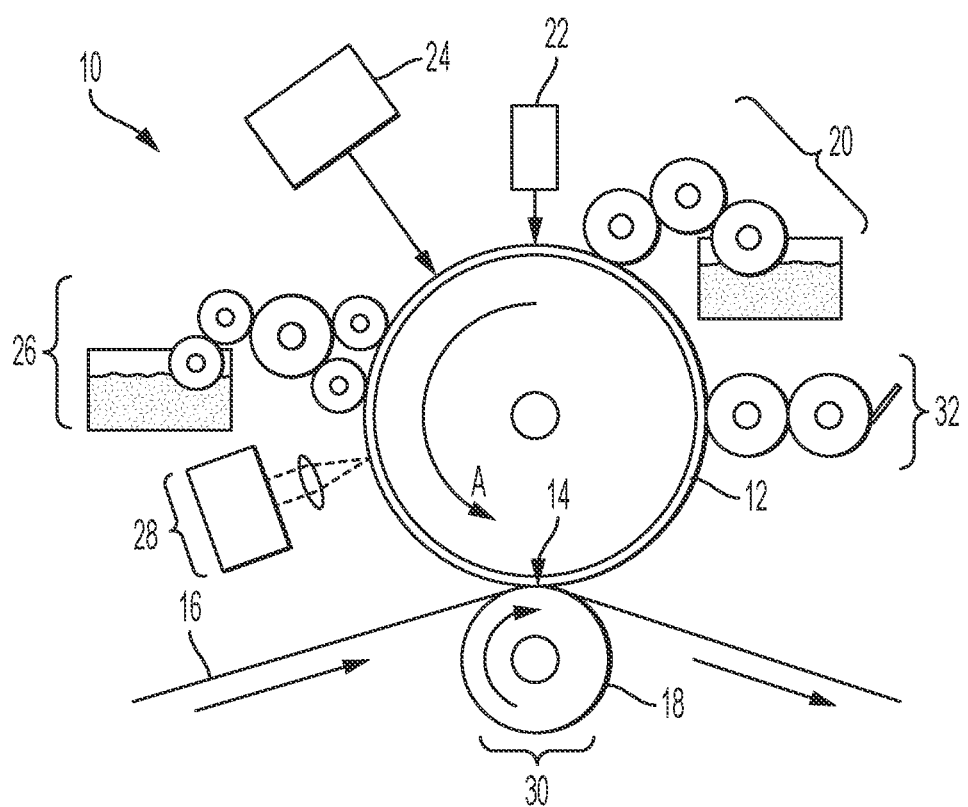
FIG. 1 is a side-view of a variable data lithography system according to various embodiments disclosed herein.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure. The following description is merely exemplary.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

As used herein, the term "polyorganosiloxane" is used interchangeably with "siloxane," "silicone," "silicone oil," and "silicone rubber." Polyorganosiloxanes are well-understood to those of skill in the relevant art to refer to siloxanes having a backbone formed from silicon and oxygen atoms and sidechains containing carbon and hydrogen atoms. As used herein, the term "silicone" should also be understood to exclude siloxanes that contain fluorine atoms, while the term "fluorosilicone" is used to cover the class of siloxanes that contain fluorine atoms. Other atoms may be present in the silicone, for example, nitrogen atoms in amine groups which are used to link siloxane chains together during crosslinking.

The term "fluorosilicone" as used herein refers to polyorganosiloxanes having a backbone formed from silicon and oxygen atoms, and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit additional cross-linking. When the cross-linking is complete, such groups become part of the backbone of the overall fluorosilicone. The side chains of the polyorganosiloxane can also be alkyl or aryl. Fluorosilicones are commercially available, for example CF1-3510 from NuSil® or SLM (n-27) from Wacker.

The term "dispersant" as used herein is used interchangeably with "dispersing agent," "wetting agent," "emulsifier," "emulsification agent," or "surfactant." Dispersants are well-understood to those of skill in the relevant art to refer to compounds that improve the separation of and prevent clumping of additive fillers when added to a suspension or dispersion of particles in a liquid that form a portion of or the total of a coating composition. Dispersants as described herein enable the formation of molecular clusters or micelles within a formulation or dispersion thereby contributing to a reduction of surface tension between components of a formulation or dispersion, such as the surface tension between a filler and a liquid dispersion. These chemical species may include one or more chemical functional species that have hydrophilic functionality, hydrophobic functionality, ionic character, nonionic character, or combinations thereof.

The terms "media substrate," "print substrate," and "print media" generally refer to a usually flexible physical sheet of paper, polymer, Mylar® material, plastic, or other suitable physical print media substrate, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A printing system can place marks on any surface, and is any machine that reads marks on input sheets, or any combination of such machines.

As used herein, the term "ink-based digital printing" is used interchangeably with "variable data lithography printing" and "digital offset printing," and refers to lithographic printing of variable image data for producing images on a substrate that are changeable with each subsequent rendering of an image on the substrate in an image forming process. As used herein, "ink-based digital printing" includes offset printing of ink images using lithographic ink where the images are based on digital image data that may vary from image to image. As used herein, the ink-based digital printing may use a "digital architecture for lithographic ink" (DALI) or a variable data lithography printing system or a digital offset printing system, where the system is configured for lithographic printing using lithographic inks and based on digital image data, which may vary from one image to the next. As used herein, an ink-based digital printing system using DALI may be referred to as a DALI printer. As used herein, an imaging member of a DALI printer may be referred to interchangeably as a DALI printing plate and a DALI imaging blanket.

All physical properties that are defined hereinafter are measured at 20° C. to 25° C. unless otherwise specified. The term "room temperature" refers to a temperature ranging from about 20° C. to about 25° C., such as about 22° C., unless otherwise specified.

Many of the examples mentioned herein are directed to an imaging blanket (including, for example, a printing sleeve, belt, imaging blanket employed on a drum, and the like) that has a uniformly grained and textured blanket surface that is ink-patterned for printing. Further examples of variable data lithographic printing are disclosed in U.S. Patent Application Publication No. 2012/0103212 A1 (the '212 publication) published May 3, 2012, and based on U.S. patent application Ser. No. 13/095,714, which is commonly assigned, and the disclosure of which is hereby incorporated by reference herein in its entirety.

FIG. 1 depicts an exemplary variable data lithography printing system 10. A general description of the exemplary system 10 shown in FIG. 1 is provided here. Additional details regarding individual components and/or subsystems shown in the exemplary system 10 of FIG. 1 may be found in the '212 publication. As shown in FIG. 1, the exemplary system 10 may include an imaging member 12 used to apply an inked image to a target image receiving media substrate 16 at a transfer nip 14. The transfer nip 14 is produced by an impression roller 18, as part of an image transfer mechanism 30, exerting pressure in the direction of the imaging member 12.

The imaging member 12 may include a reimageable surface layer (imaging blanket layer or carcass) formed over a structural mounting layer that may be, for example, a cylindrical core, or one or more structural layers over a cylindrical core. A fountain solution subsystem 20 may be provided generally comprising a series of rollers, which may be considered as dampening rollers or a dampening unit, for uniformly wetting the reimageable surface with a layer of dampening fluid or fountain solution, generally having a uniform thickness, to the reimageable surface of the imaging member 12. Once the dampening fluid or fountain solution is metered onto the reimageable surface, a thickness of the layer of dampening fluid or fountain solution may be measured using a sensor 22 that provides feedback to control the metering of the dampening fluid or fountain solution onto the reimageable surface.

An optical patterning subsystem 24 may be used to selectively form a latent image in the uniform fountain solution layer by image-wise patterning the fountain solution layer using, for example, laser energy. It is advantageous to form the reimageable surface of the imaging member 12 from materials that should ideally absorb most of the infrared or laser energy emitted from the optical patterning subsystem 24 close to the reimageable surface. Forming the surface of such materials may advantageously aid in substantially minimizing energy wasted in heating the fountain solution and coincidentally minimizing lateral spreading of heat in order to maintain a high spatial resolution capability. Briefly, the application of optical patterning energy from the optical patterning subsystem 24 results in selective evaporation of portions of the uniform layer of fountain solution in a manner that produces a latent image.

The patterned layer of fountain solution having a latent image over the reimageable surface of the imaging member 12 is then presented or introduced to an inker subsystem 26. The inker subsystem 26 is usable to apply a uniform layer of ink over the patterned layer of fountain solution and the reimageable surface of the imaging member 12. In embodiments, the inker subsystem 26 may use an anilox roller to meter an ink onto one or more ink forming rollers that are in contact with the reimageable surface of the imaging member 12. In other embodiments, the inker subsystem 26 may include other traditional elements such as a series of metering rollers to provide a precise feed rate of ink to the reimageable surface. Ink from the inker subsystem 26 may adhere to the areas of the reimageable surface that do not have fountain solution thereon to form an ink image, while ink deposited on the areas of the reimageable surface on which the fountain solution layer remains will not adhere to the reimageable surface.

Cohesiveness and viscosity of the ink residing on the reimageable plate surface may be modified by a number of mechanisms, including through the use of some manner of rheology control subsystem 28. In embodiments, the rheology control subsystem 28 may form a partial cross-linking core of the ink on the reimageable plate surface to, for example, increase ink cohesive strength relative to an adhesive strength of the ink to the reimageable plate surface. In embodiments, certain curing mechanisms may be employed. These curing mechanisms may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable surface of imaging member 12 to media substrate 16 using the transfer subsystem 30. With the adhesion and/or cohesion of the ink having been modified by the rheology control system 28, modified adhesion and/or cohesion of the ink causes the ink to transfer substantially completely, preferentially adhering to the media substrate 16 as it separates from the reimageable surface of the imaging member 12 at the transfer nip 14. Careful control of the temperature and pressure conditions at the transfer nip 14, among other things, may allow transfer efficiencies for the ink from the reimageable plate surface of the imaging member 12 to the media substrate 16 to exceed, for example, 95%. While it is possible that some fountain solution may also wet substrate 16, the volume of such transferred fountain solution will generally be minimal so as to rapidly evaporate or otherwise be absorbed by the substrate 16.

Finally, a cleaning system 32 is provided to remove residual products, including non-transferred residual ink and/or remaining fountain solution from the reimageable surface in a manner that is intended to prepare and condition the reimageable surface of the imaging member 12 to repeat the above cycle for image transfer. An air knife may be employed to remove residual fountain solution. It is anticipated, however, that some amount of ink residue may remain. Removal of such remaining ink residue may be accomplished by cleaning subsystem 32. The cleaning subsystem 32 may include, for example, at least a first cleaning member, such as a sticky or tacky member, in physical contact with the reimageable surface of the imaging member 12, where the sticky or tacky member removes residual ink and any remaining small amounts of surfactant compounds from the fountain solution of the reimageable surface of the imaging member 12. The sticky or tacky member may then be brought into contact with a smooth roller to which residual ink may be transferred from the sticky or tacky member, the ink being subsequently stripped from the smooth roller by, for example, a doctor blade. Any other suitable cleaning system can be employed.

Regardless of the type of cleaning system used, cleaning of the residual ink and fountain solution from the reimageable surface of the imaging member 12 can prevent or reduce the risk of a residual image from being printed in the proposed system. Once cleaned, the reimageable surface of the imaging member 12 is again presented to the fountain solution subsystem 20 by which a fresh layer of fountain solution is supplied to the reimageable surface of the imaging member 12, and the process is repeated. As the process is repeated, natural wear of the imaging member blanket may occur, causing the ink transferred to the media substrate 16 to exhibit coating defects such as premature wear of the topcoat due to reduced or variable crosslink density, which may cause gloss differential defects in the prints. In such an instance, the gloss of a print patch from an area of high wear may appear different than the gloss from a non-worn or low wear area. Disclosed herein is a topcoat composition for use on an imaging blanket comprising at least one fluorosilicone, at least one hydride-functional crosslinking agent, at least one infrared-absorbing filler, such as carbon black, and at least one dispersant present in an amount ranging from greater than about 0.1% to about 5%, based on a total weight of the composition. The topcoat composition disclosed herein may provide a topcoat composition with optimized properties, such as crosslink density, while maintaining consistent print quality, including reduced coating defects, such as a reduced tree-bark effect, premature wear of topcoat due to reduced or variable crosslink density, or gloss differential defects in the prints, without affecting surface roughness, topcoat deformation as measured by the viscoelastic properties of the topcoat composition, image quality, as compared to a topcoat composition comprising, for example, one or more alternate dispersants.

In certain embodiments, the topcoat compositions disclosed herein further comprise at least one fluorosilicone. As used herein, fluorosilicone refer to polyorganosiloxanes having a backbone formed from silicon and oxygen atoms and sidechains containing carbon, hydrogen, and fluorine atoms.

The sidechains can be linear, branched, cyclic, or aromatic, and the fluorosilicone may also contain functional groups, such as amino groups, that permit additional crosslinking. When the crosslinking is complete, such groups become part of the backbone of the overall fluorosilicone.

In certain embodiments of the fluorosilicones disclosed herein, at least 75% of the siloxane units are fluorinated. The percentage of fluorinated siloxane units can be determined by considering that each silicon atom contains two possible sidechains. The percentage is calculated as the number of sidechains having at least one fluorine atoms divided by the total number of sidechains (i.e., twice the number of silicon atoms). In certain embodiments, the fluorosilicone is a vinyl-functional fluorosilicone, such as a vinyl-terminated trifluoropropyl methylsiloxane polymer (e.g., SML 50330 available from Wacker). In certain embodiments, the at least one fluorosilicone may be present in the topcoat composition in an amount ranging from about 20% to about 80%, such as from about 40% to about 70% or from about 55% to about 65%, by weight based on the total weight of the topcoat composition.

In certain embodiments, the topcoat compositions disclosed herein further comprise at least one infrared-absorbing filler. The at least one infrared-absorbing filler is able to absorb energy from the infra-red portion of the spectrum (having a wavelength of from about 750 nm to about 1000 nm). This may aid in efficient evaporation of a fountain solution. In certain embodiments, the at least one infrared-absorbing filler may be chosen from carbon black, a metal oxide such as iron oxide, carbon nanotubes, graphene, graphite, or carbon fibers. The at least one infrared-absorbing filler may have an average particle size of from about 2 nanometers to about 10 microns, such as from about 20 nanometers to about 5 microns or from about 100 nanometers to about 1 micron.

In certain embodiments, a heat-treated carbon black may be used. In this regard, carbon black powders are known to contain sulfur in trace quantities that may be difficult to detect, even in "low-sulfur" grades of carbon black. Sulfur is known to be a platinum catalyst poison and may inhibit platinum from acting as a catalyst. Carbon black may be heat treated prior to use. Without being bound by theory, it is believed that the heat treatment may reduce any free sulfur content in the carbon black, and thus enhance curing of the topcoat composition by reducing platinum catalyst poisoning. Therefore, according to certain embodiments of the disclosure, the infrared-absorbing filler is a low-sulfur carbon black, for example a carbon black having a sulfur content of about 0.3% or less, such as about 0.15% or less.

In this regard, sulfur has a boiling point of about 445° C. Thus, the carbon black should be heated above this temperature to fully extract any sulfur present in the carbon black. In certain embodiments, the carbon black is heat treated to a temperature of at least about 445° C., such as at least about 550° C. or at least about 600° C. In certain embodiments, the carbon black is heat treated for a time period ranging from about 30 minutes to about 2 hours.

In certain embodiments, the at least one infrared-absorbing filler may be present in the topcoat composition in an amount ranging from about 5% to about 35%, such as from about 5% to about 20%, from about 5% to about 10%, from about 7% to about 17% or from about 10% to about 15%, by weight based on the total weight of the topcoat composition.

In certain embodiments, the topcoat composition disclosed herein comprises silicon dioxide (also referred to herein as silica or $SiO_2$) in an amount ranging from greater than about 5% to about 10%, based on the total weight of the topcoat composition. Silica can help increase the tensile strength of the topcoat composition and increase wear resistance. Silica may be present in an amount ranging from greater than about 5% to about 10% by weight based on the total weight of the topcoat composition, such as from about 5.5% to about 8%, from about 6% to about 7%, from about 6.5% to about 6.7%, or about 6.5%. The silica may have an average particle size ranging from about 10 nm to about 0.2 μm, such as from about 50 nm to about 0.1 μm or about 20 nm.

In certain embodiments, the topcoat composition disclosed herein further comprises additional components, such as, for example, a crosslinking agent, a catalyst, a solvent such as an alkyl-acetate solvent (e.g., butyl acetate), a dispersant, and/or an inhibitor. In certain embodiments, the solvent in the topcoat composition may be an environmentally-friendly organic solvent, such as butyl acetate.

In certain embodiments, the topcoat composition may further comprise a crosslinking agent. The crosslinking agent may be chosen from any crosslinking agent known in the art, and may, for example, be a methylhydrosiloxane-trifluoropropylmethylsiloxane, such as an XL-150 crosslinker commercially available from NuSil, or a methyl hydrosiloxane-trifluoropropylmethyl siloxane, such as SLM 50336 commercially available from Wacker. In certain embodiments, the crosslinking agent may be present in the topcoat composition in an amount ranging from about 10% to about 28%, such as from about 12% to about 20% or about 15%, by weight based on the total weight of the topcoat composition. The fluorosilicone may be combined with the crosslinking agent to form a crosslinked fluorosilicone elastomer, wherein the infrared-absorbing filler and the silica are dispersed throughout the crosslinked fluorosilicone. In certain instances, the crosslinked fluorosilicone can be formed by a platinum-catalyzed crosslinking reaction between a vinyl-functional silicone and at least one of a hydride-functional silicone or a hydride-functional fluorosilicone. The infrared-absorbing filler and the silica may be dispersed throughout the vinyl-functional fluorosilicone before the crosslinking reaction.

In certain embodiments, the topcoat composition may further comprise a catalyst, such as a platinum catalyst, for example a 14.3% Platinum in butyl acetate. In one embodiment, the topcoat composition comprises between about 0.15% and about 0.35%, such as between about 0.2% and about 0.3% or about 0.25%, by weight of a catalyst based on the total weight of the topcoat composition.

In certain embodiments, the topcoat composition may further comprise at least one dispersant. While the dispersant may be chosen from any dispersant recognized in the art, such as, for example, a polyoxyalkylene amine derivative (e.g., Zephrym® PD 7000 available from Croda International Plc), the topcoat composition disclosed herein includes a polyethylene glycol-hydroxystearic acid copolymer (e.g., Zephrym® PD 2206 available from Croda International Plc) in an amount ranging from greater than about 0.1% to about 5%, based on the total weight of the topcoat composition. The dispersant may be added to the topcoat composition in an amount ranging from about 0.1% to about 5%, such as from about 0.5% to about 2.5% or from about 1% to about 2%, by weight based on the total weight of the topcoat composition. In certain embodiments, the ratio of the at least one infrared-absorbing filler to the dispersant may range from about 5:1 to about 20:1, such as from about 10:1 to about 18:1. A dispersant may ensure that the infrared-absorbing filler and the silica are sufficiently dispersed throughout the fluorosilicone matrix.

In certain embodiments, the topcoat composition disclosed herein may exhibit unexpectedly superior properties over similar topcoat compositions comprising, for example dispersants such as polyoxyalkylene amine derivatives. For example, the topcoat compositions disclosed herein may exhibit improved degree of crosslinking resulting in a top coat formulation exhibiting improved properties and performance and therefore may result in an imaging blanket that is longer-lasting than an imaging blanket comprising a topcoat composition that comprises polyoxyalkylene amine derivatives or other amine-functional dispersants. Additionally, the topcoat compositions disclosed herein may have improved consistency in print properties across the surface of the topcoat when coated on an imaging blanket as well as improved processing properties such as storage time or working pot life prior to coating. It has been observed that topcoat compositions that comprise polyoxyalkylene amine derivatives, such as Zephrym™ PD7000, can result in reduced or variable degree of crosslinking of the topcoat composition which translates to reduced or variable physical properties of the finished top coat composition. This reduction of properties further translates to potential performance or processing shortfalls in imaging blanket print quality performance. Unexpectedly, when alternate dispersants such as a polyethylene glycol-hydroxystearic acid copolymer, such as Zephrym™ PD 2206 are used, improved degree of crosslinking and therefore improved physical properties and print quality performance are likewise observed. Accordingly, in certain aspects of the disclosure, the crosslink density of topcoat compositions or the imaging blanket that has been coated with a topcoat composition as disclosed herein may range from about 10 µg per hour per mg of dried topcoat as measured by 1H NMR to about 400 µg per hour per mg, such as from about 20 µg per hour per mg to about 70 µg per hour per mg or from about 50 µg per hour per mg to about 200 µg per hour per mg, as measured by 1H NMR analysis of residual fluorosilicone content in a chloroform extraction, the topcoat composition properties are improved with no sacrifice of other print quality or performance attributes of imaging blankets having improved topcoat compositions.

While known topcoat compositions use polyoxyalkylene amine derivative dispersants having amine functionality, such dispersants may interact with residual or environmental moisture to react with hydride groups of the topcoat crosslinking agent. Such an interaction has been shown to have a detrimental effect on the extent of crosslinking as well as the variability of the crosslinking in known topcoat compositions. While not wishing to be bound by theory, it is thought that the amine groups present in known dispersants react with moisture to catalyze and consume hydride functional groups of the cross linker and evolve hydrogen gas prior to a crosslinking reaction. As hydride functional groups are consumed by reaction with the amine functional dispersant, they are thus unavailable to react with and participate in a crosslinking reaction with functional groups, such as vinyl-functional groups in the fluorosilicone. The topcoat composition disclosed herein includes a dispersant that does not have a terminal amine functionality and is not based on a polyoxyalkylene amine derivative. Rather, the topcoat composition comprises a polyethylene glycol-hydroxystearic acid copolymer such as Zephrym™ PD 2206 available from Croda International Plc, a polymeric perfluorobutane sulfonic acid derivatives, such as Fluorosurfactant FC-4432 available from 3M™, a polycaprolactone-aromatic polyisocyanurate, such as Disperbyk® 167 or Disperbyk® 168 available from BYK® or combinations thereof. Other dispersants that are non-reactive with the hydride-functional crosslinking agent are also suitable.

In certain embodiments, the topcoat composition may further comprise at least one polymerization inhibitor. The at least one polymerization inhibitor may be chosen from any inhibitor known in the art, such as the inhibitor PT 88. In certain embodiments, the at least one polymerization inhibitor may be present in the topcoat composition in an amount ranging from about 0.1% to about 5%, such as from about 0.5% to about 1%, by weight based on the total weight of the topcoat composition.

In certain embodiments, the topcoat compositions disclosed herein may be made by combining a first ingredient with a solvent and beads, rolling, combining a second ingredient, rolling, combining a third ingredient, rolling, etc. For example, in certain embodiments, a dispersant may be combined with a solvent and steel beads and rolled; next, an infrared-absorbing filler is combined with the dispersant mixture and rolled, and then silica is combined with the dispersant and infrared-absorbing filler and rolled. Next, an inhibitor is added to the mixture, rolled, and then a flourosilicone is added and rolled. Finally, a crosslinking agent is added to the mixture and rolled. After rolling, the mixture may be filtered to remove the beads, and a catalyst, such as an acid catalyst, may be added. The catalyzed mixture may then be filtered and de-gassed before application to an imaging blanket as a topcoat. In certain embodiments, the ratio of Si—H to vinyl groups in the topcoat composition ranges from about 1 to about 2, such as 1.12.

Further disclosed herein is a method of making an imaging blanket having an improved topcoat. In certain embodiments, the method comprises coating the topcoat composition disclosed herein on a substrate and curing the topcoat composition to form the improved imaging blanket. The substrates disclosed herein can be rolls, belts, or plates mounted to rolls, as is well-known in the art. The substrate can be made of any suitable material, such as, for example, polymers such as polyimide; silicone or biaxially-oriented polyethylene terephthalate (e.g., Mylar®); metals such as nickel, aluminum, or aluminum alloys; woven fabric; quartz; plastic composites; or combinations thereof. The topcoat composition disclosed herein may be coated on the substrate by any method known in the art, such as by flow coating, dip-coating, draw bar coating, or ribbon flow coating.

When coated on the imaging blanket, the topcoat composition disclosed herein may have a thickness ranging from about 0.5 µm to about 4 mm, depending on the requirements of the overall printing system. In certain embodiments, the topcoat composition may be applied to the imaging blanket and then cured. The curing may be performed at an elevated temperature, such as a temperature ranging from about 135° C. to about 165° C., such as about 160° C. This elevated temperature is in contrast to room temperature. The curing may occur for a time period of from about 15 minutes to about 5 hours, such as about 1 hour to about 4 hours or from about 2 hours to about 3 hours. In certain embodiments, the curing may occur at about 160° C. for about 4 hours. The topcoat composition may further comprise a catalyst, such as a platinum catalyst, which may serve to reduce the time and/or temperature for curing.

As disclosed herein, the imaging blankets coated with the topcoat composition disclosed herein may demonstrate enhanced imaging capabilities, for example by reducing coating defects on a target image receiving media substrate. In certain embodiments, the imaging blanket as disclosed herein may show improved coating properties in that during printing, the resultant image exhibits reduced coating defects, such as reduced tree-bark defects and other visual imperfections. This enhanced imaging capability may be observed in part because the coated imaging blanket maintains desirable surface roughness and mechanical properties, such as viscoelastic properties. The properties of the topcoat composition coated on the imaging blanket can ensure good and long-lasting print quality.

For example, the topcoat composition on the imaging blanket can conform to the texture of a target substrate, which may have surface peak-to-valley depth somewhat greater than the surface peak-to-valley depth of the imaging blanket. These peaks and valleys that make up the topcoat surface may enhance the static or dynamic surface energy forces that attract the fountain solution to the topcoat surface. This reduces the tendency of the fountain solution to be forced away from the surface by roller nip action. Thus, the surface roughness of the imaging blanket may help to deliver a more uniform layer of printing material to the target substrate, free of defects such as mottle. Sufficient pressure is used to transfer the image from the imaging blanket to the target substrate, wherein pinching the target substrate between the imaging blanket and an impression roller provides this pressure. The topcoat composition should also have desirable mechanical properties, including viscoelasticity, such that the deformation of the topcoat composition caused by the pressure of the impression roller is sufficient to adhere the fountain solution to the target substrate.

Mechanical properties may be evaluated, for example, by dynamic mechanical analysis (DMA), such as a DMA Q800 apparatus commercially-available from TA Instruments. The DMA apparatus applies a sinusoidal stress to a cured topcoat composition while measuring the resulting strain. From the stress/strain data, the complex modulus (G*) may be calculated, as well as the storage modulus (G'), the loss modulus (G"), and the loss tangent (tan $\delta$) were extracted from the complex modulus. Storage modulus is the elastic constituent of a material and can be related to material stiffness (the greater the value, the greater the stiffness). Loss modulus is a measure of the viscous nature of a material and can be related to the material's ability to dissipate energy via molecular motion (the greater the value, the more viscous nature). The tan $\delta$ is the ratio of loss modulus to storage modulus (G"/G'). A material having a higher tan $\delta$ tends to have a higher viscosity, whereas a material having a lower tan $\delta$ tends to have a higher elasticity. In certain embodiments disclosed herein, the topcoat composition may have a tan $\delta$ ranging from about 0.02 to about 0.8 at an operating temperature from 100° C. to −70° C. or from about 0.05 to about 0.15 at an operating temperature from 50° C. to 0° C.

In certain exemplary embodiments, the mean surface roughness ($R_a$) of the topcoat composition or the imaging blanket that has been coated with a topcoat composition as disclosed herein may range from about 0.2 µm to about 1 mm, such as from about 0.2 µm to about 1 µm or from about 0.3 µm to about 0.7 µm. $R_a$ may be measured by any means known in the art. For example, in certain embodiments, $R_a$ may be measured using a stylus-type surface roughness meter, such as SURFCOM 1400A produced by Tokyo Seimitsu Co., Ltd.

In certain exemplary embodiments, the crosslink density of topcoat compositions or the imaging blanket that has been coated with a topcoat composition as disclosed herein may range from about 10 µg per hour per mg of dried topcoat as measured by 1H NMR to about 400 µg per hour per mg, such as from about 20 µg per hour per mg to about 70 µg per hour per mg or from about 50 µg per hour per mg to about 200 µg per hour per mg. Degree of crosslinking otherwise known as crosslink density may be measured by any means known in the art. For example, in certain embodiments, Degree of crosslinking may be measured using $^1$H NMR analysis of residual fluorosilicone content in a chloroform extraction.

Further disclosed herein are processes for variable data lithographic printing using an imaging blanket comprising a topcoat composition as disclosed herein. In certain embodiments, the process comprises applying a fountain solution to an imaging member comprising a topcoat composition as disclosed herein. A latent image is formed by evaporating the fountain solution from selective locations on the imaging member surface to form hydrophobic non-image areas and hydrophilic image areas, which form the latent image. The latent image may be developed by applying an ink composition to the hydrophilic image areas and transferring the developed latent image to a receiving substrate.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

EXAMPLES

The following Examples are being submitted to further define various species of the present disclosure. These Examples are intended to be illustrative only and are not intended to limit the scope of the present disclosure. Parts and percentages are by weight unless otherwise indicated.

Example 1—Hydride Stability and Reactivity of Crosslinker with Dispersants

The degradation of the Si—H groups of the crosslinker (SLM50336) was evaluated by $^1$H NMR or proton NMR.

The crosslinker was heated in the presence and absence of the dispersants listed in Table 1 at 80° C. As shown in Table 1 and in FIG. 2, the Si—H groups of the crosslinker (SLM50336) reacted in presence of Zephrym® PD 7000 dispersant, Zephrym® PD 2206, Disperbyk® 167, Disperbyk® 168, and 3M™ FC-4432. The reactivity of the dispersant with the crosslinker was measured by the subsequent evolution of hydrogen gas according to the following reaction:

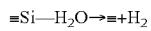

≡Si—H$_2$O→≡+H$_2$

Table 1 shows comparative degradation of each dispersant listed in the presence of crosslinker SLM50336 and the Hydride (SiH) groups as a percentage of initial concentration as detected by $^1$H NMR after 24 hours.

TABLE 1

Hydride Stability as measured by SiH signal as a percent of initial concentration at Time Zero and after 24 hours.

| Topcoat with dispersant | SiH Signal (Percent of Initial Concentration) as a function of time in hours | |
| --- | --- | --- |
| | Time Zero | 24 hours |
| Zephrym ® PD 7000 | 100 | 13 |
| Zephrym ® PD 2206 | 100 | 100 |
| Disperbyk ® 167 | 100 | 98 |
| Disperbyk ® 168 | 100 | 94 |
| 3M ™ FC-4432 | 100 | 100 |

SiH functionality from the crosslinker SLM50336 was consumed with the presence of Zephrym® PD 7000 in a shorter time as compared to the other candidate dispersants evaluated. Subsequently, the degree of crosslinking was significantly reduced in topcoat formulations having Zephrym® PD 7000 dispersant. Supporting confirmation of crosslinker degradation is visually observable by heating the crosslinker (methyl hydrosiloxane-trifluoropropylmethyl siloxane, SLM 50336) in the presence of the Zephrym® PD 7000 dispersant. Both visual observation of bubbling and the $^1$H NMR data indicate less bubbling and less degradation of hydride groups as evidenced in Table 1 for each of the dispersant alternatives as compared to the diethylethanolamine-terminated Zephrym® PD 7000 dispersant. Visible gas bubbling is observed and thought to be a result of the evolution of hydrogen gas according to the reaction noted above. Additional experimentation exhibits that the degradation of the hydride functional group of the crosslinker also occurs at room temperature.

Example 2—Crosslink Density of Topcoat Formulations

Topcoat formulations having dispersants Zephrym® PD 7000 and Zephrym® PD 2206 were prepared and evaluated. To prepare the topcoat formulations, carbon black, silica, and steel beads were placed in a vacuum oven at 80° C. and 22.5" pressure for 1 hour to dry. The dispersant, n-butyl acetate, and steel beads were added into a high-density polyethylene (HDPE) bottle, shaken, and put on a roll mill for 5 minutes. The oven-dried carbon black was then added to the HDPE bottle, shaken, and put on a roll mill for 1 hour. An inhibitor was added, shaken, and rolled for 10 minutes, and then fluorosilicone SLM50330 was added, shaken, and rolled for 10 minutes. Finally, a crosslinker SLM50336 was added, shaken, and put on a roll mill overnight at about 108 revolutions/min for at least 18 hours. The total rolling time of the dispersion was between 20 to 24 hours.

The following day, before coating, the steel beads were filtered out and the viscosity was measured to ensure a viscosity between about 380 and 420 cP. A catalyst was added to the bottle and put on the roll mill for 5 minutes, and the dispersion was then filtered through a 40 micron fabric filter, de-gassed for 15 minutes, and coated onto a carcass as a topcoat. The topcoat composition was then cured at 160° C. for 4 hours.

Figure 2:
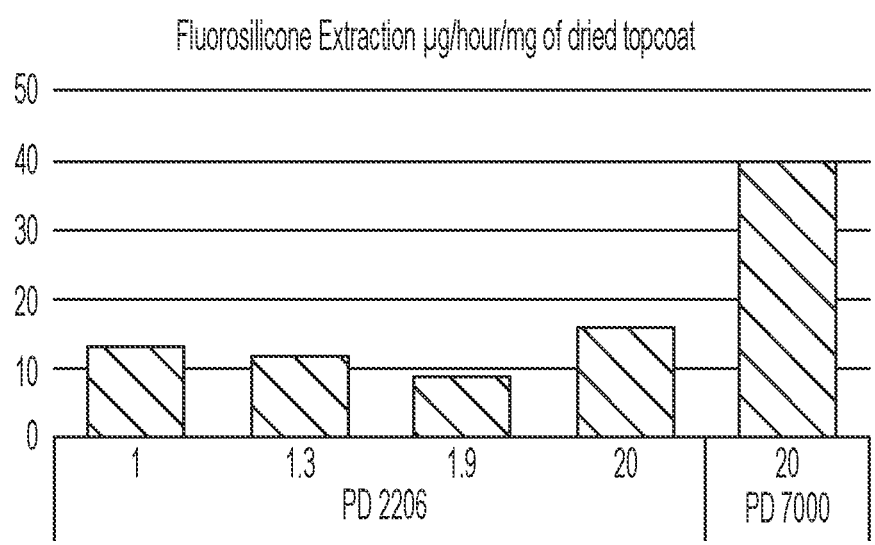
FIG. 2 is a plot showing degree of crosslinking as measured by fluorosilicone extraction in µg per hour per mg of dried topcoat as measured by $^1$H NMR for topcoat compositions incorporating four ratios of carbon black to Zephrym® PD 2206 dispersant—1, 1.3, 1.9 and 20—as compared to a topcoat formulation comprising Zephrym® PD 7000 dispersant as a control.

Crosslink density, or the degree of fluorosilicone crosslinking for topcoat compositions was measured by punching out 20 mm circles from belts having the topcoat compositions coated upon them using a hollow puncher. The 20 mm circles were each placed into 18 mL vials. To each vial, 1 mL of deuterated chloroform was added and the vials were tightly closed. The samples were placed on a horizontal shaker at a high setting for one hour. $^1$H-NMR measurements were completed using a Bruker AV400 NMR spectrometer. Residual CHCl$_3$ peak was used as a quantification reference. This CHCl$_3$ peak was calibrated in a separate experiment with respect to a known amount of added PDMS. Thus, the degree of fluorosilicone crosslinking was measured by fluorosilicone extractable signal from NMR, showing a lower level of extractable fluorosilicone in the topcoat compositions using the Zephrym® PD 2206 dispersant as compared to the Zephrym® PD 7000 dispersant. FIG. 2 is a plot showing degree of crosslinking as measured by fluorosilicone extraction in μg per hour per mg of dried topcoat as measured by $^1$H NMR for topcoat compositions incorporating four ratios of carbon black to Zephrym® PD 2206 dispersant—1, 1.3, 1.9 and 20—as compared to a topcoat formulation comprising Zephrym® PD 7000 dispersant as a control.

It is expected that dispersants such as the Disperbyk® 167, Disperbyk® 168, and 3M™ FC-4432, that do not have amine functionality as does the Zephrym® PD 7000 would also exhibit lower extractable fluorosilicone as well. Lower extractable quantity of fluorosilicone of the topcoat formulation incorporating the Zephrym® PD 2206 dispersant is an indication and confirmation of improved crosslink density of the topcoat composition.

Example 3—Physical Properties and Print Evaluation of Topcoat Formulations

A topcoat formulation with Zephrym® PD 2206 dispersant was formulated at the ratio of carbon black to dispersant of 10 for a pilot coating. As compared to a topcoat formulation with Zephrym® PD 7000 dispersant, the topcoat with Zephrym® PD 2206 dispersant shows no change physical performance.

Tree-bark defects were observed by a visual subjective image rating for the topcoat compositions printed with a DALI engine. Visual subjective image rating of the coating defect for tree bark was reduced to zero for both topcoat formulations. The roughness of the topcoats containing both dispersants was also measured, including the mean roughness ($R_a$), the number of peak counts greater than about 2 μm, and the number of valley counts greater than about 2 μm. There was no significant difference measured between the roughness in the Zephrym® PD 2206 samples and the Zephrym® PD 7000 samples tested, as shown below in Table 2.

It was further noted that there was no change in mechanical property (e.g., viscoelasticity) of the resultant topcoat when a Zephrym® PD 2206 dispersant topcoat was used as compared to a Zephrym® PD 7000 topcoat. In this regard, Tan Delta at 25° C. was measured by Dynamic Mechanical Analysis (DMA). DMA is a technique known in the art wherein a deformation stress is applied to a sample topcoat in a cyclic manner, allowing the topcoat material being analyzed time to respond to stress and/or other values being tested. The DMA measures the damping of the material as the tan delta, a measure of the samples elastic behavior. Tan delta is measure of the energy dissipation of the material. The tan delta of the samples is shown below in Table 2.

TABLE 2

Physical properties and Print evaluation of Topcoat Formulations

| | Properties | Target | Belt with PD2206 | Belt with PD7000 |
|---|---|---|---|---|
| Print Quality | xRite - Optical Density (100% DAC) | 1.4-1.55 | 1.52 | 1.51 |
| | xRite - Background (AL* = Blank-Bg) | <0.5 | 0.05 | 0.02 |
| | IQAF - Background Graininess | <1.2 | 1.041 | 1.104 |
| | IQAF - Solid Mottle (NMF) | <20 | 14.59 | 13.35 |
| | IQAF - Peak Mottle (NMF/Density) | <30/<0.6 | 23.32/0.32 | 22.9/0.45 |
| | IQAF - Solid VNHF (100% DAC) | <1.6 | 1.411 | 1.378 |
| | IQAF - Macrouniformity DAC (20% HT) | <100 | 77 | 76 |
| | IQAF - Raggedness (P—H 203 um, Target6) | <1.5 | 1.09 | 0.992 |
| | IQAF - Line Width (P—H 84 um, Target 11) | <0.2 | 0.107 | 0.104 |
| | IQAF - Line Width (P—H 353 um, Target 1) | <0.5 | 0.37 | 0.363 |
| Physical Quality | Thickness, um | 60-90 | 34 | 32 |
| | Tree Bark Defect (visual SIR) | <2 | 0 | 0 |
| | Fluorosilicone Extracted NMR 1 hr, ug/cm2 (Scaled with actual thickness of topcoat) | <50 | 10 | 14 |
| | Peak Count > 2 um | <30 | 9 | 4 |
| | Valley Count > 2 um | <30 | 1 | 1 |
| | Ra, um - Mean Roughness | <0.65 | 0.291 | 0.296 |
| | Rq, um - RMS | <0.9 | 0.427 | 0.409 |
| | Rt, um - Max Peak to Valley Height | <9 | 5.3 | 5.779 |
| | Tan Delta @ 25 C.(by DMA) | <0.1 | 0.098 | 0.0974 |

Additionally, the image quality of the images printed using a Zephrym® PD 2206 dispersant topcoat on the image blanket was comparable to the image quality of images printed using a Zephrym® PD 7000 dispersant topcoat, demonstrating that print quality observations remained consistent between the two topcoat formulations. An ink roll temperature of 67° C. was used for all runs. Observations from print testing in a DALI engine show good background performance in line with expectations. Regarding inking, Solid Area Density was in line with a target optical density (OD) between 1.4 and 1.55. Image quality and image fidelity was in line with expected performance. No issues related to transfer efficiency or cleaning were observed. In the Zephrym® PD 2206 dispersant topcoat formulation, very little to no sign of wear was observed in limited testing to date. Previous blankets with the Zephrym® PD 7000 dispersant topcoat formulation have shown wear in a similar timeframe, which indicates an improvement in wear performance with the Zephrym® PD 2206 dispersant topcoat formulation as compared to the Zephrym® PD 7000 dispersant topcoat formulation.

What is claimed is:

1. A topcoat composition for a variable data lithography imaging blanket comprising:
    at least one fluorosilicone;
    at least one hydride-functional crosslinking agent;
    at least one infrared-absorbing filler; and
    at least one dispersant comprising a polymeric perfluorobutane sulfonic acid derivative or a polycaprolactone-aromatic polyisocyanurate that is non-reactive with the hydride-functional crosslinking agent.

2. The topcoat composition of claim 1, wherein the topcoat composition has a degree of crosslinking between about 10 micrograms/hour/milligrams to about 20 micrograms/hour/milligrams.

3. The topcoat composition of claim 1, wherein the dispersant is present in an amount ranging from about 0.1% to about 5%, based on a total weight of the topcoat composition.

4. The topcoat composition of claim 1, wherein the dispersant is present in the topcoat composition in an amount ranging from about 0.5% to about 3.0%, based on a total weight of the topcoat composition.

5. The topcoat composition of claim 1, wherein the at least one infrared-absorbing filler is carbon black.

6. The topcoat composition of claim 1, wherein the at least one fluorosilicone is chosen from vinyl-terminated trifluoropropyl methylsiloxane polymer.

7. The topcoat composition of claim 1, wherein the at least one fluorosilicone is present in the topcoat composition in an amount ranging from about 40% to about 80% by weight, based on the total weight of the topcoat composition.

8. The topcoat composition of claim 1, wherein the at least one dispersant does not comprise an amine-functional dispersant.

9. The topcoat composition of claim 1, wherein the at least one dispersant further comprises a polyethylene glycol-hydroxystearic acid copolymer.

10. The topcoat composition of claim 1, wherein the at least one hydride-functional crosslinking agent is methyl hydrosiloxane-trifluoropropylmethyl siloxane.

11. The topcoat composition of claim 1, further comprising at least one catalyst.

12. The topcoat composition of claim 11, wherein the at least one catalyst is a platinum catalyst.

13. An imaging blanket for variable data lithography comprising:
    a substrate; and
    a topcoat composition according to claim 1.

14. The imaging blanket of claim 13, wherein the substrate comprises at least one material selected from the group consisting of metals, polyimides, plastic composites, and woven fabrics.

15. The imaging blanket of claim 13, wherein the topcoat composition has a thickness ranging from about 0.5 µm to about 4 mm.

16. The imaging blanket of claim 13, wherein the topcoat composition is cured to the substrate at a temperature ranging from about 135° C. to about 165° C. for a time period ranging from about 15 minutes to about 5 hours.

* * * * *